United States Patent [19]

Sanborn

[11] Patent Number: 5,505,059
[45] Date of Patent: Apr. 9, 1996

[54] DIRECT HEATED ADSORBENT BED HEAT PUMP

[75] Inventor: David M. Sanborn, Marietta, Ga.

[73] Assignee: Gas Research Institute, Chicago, Ill.

[21] Appl. No.: 180,720

[22] Filed: Jan. 13, 1994

[51] Int. Cl.⁶ ............................... F25B 17/00
[52] U.S. Cl. ........................... 62/480; 62/324.4
[58] Field of Search ............... 62/174, 269, 270, 62/480, 324.4, 333, 336, 77, 106

[56] References Cited

U.S. PATENT DOCUMENTS

| | | | |
|---|---|---|---|
| 1,833,901 | 12/1931 | Hull | 62/480 |
| 2,024,083 | 12/1935 | Young | 62/118 |
| 2,131,119 | 9/1938 | Root et al. | 62/179 |
| 3,007,543 | 11/1961 | Maher | 183/4.7 |
| 3,828,566 | 8/1974 | Wetzel | 62/143 |
| 4,183,227 | 1/1980 | Bouvin et al. | 62/480 |
| 4,548,046 | 10/1985 | Brandon et al. | 62/79 |
| 4,610,148 | 9/1986 | Shelton | 62/480 |
| 4,694,659 | 9/1987 | Shelton | 62/106 |
| 4,709,558 | 12/1987 | Matsushita et al. | 62/480 |
| 4,881,376 | 11/1989 | Yonezawa et al. | 62/480 |
| 4,924,676 | 5/1990 | Maier-Laxhuber et al. | 62/59 |
| 4,944,159 | 7/1990 | Crozat | 62/112 |
| 4,976,117 | 12/1990 | Crozat et al. | 62/480 |
| 5,005,371 | 4/1991 | Yonezawa et al. | 62/238.6 |
| 5,046,319 | 9/1991 | Jones | 62/46.2 |
| 5,062,275 | 11/1991 | Hirata et al. | 62/114 |
| 5,142,884 | 9/1992 | Scaringe et al. | 62/324.4 |
| 5,174,365 | 12/1992 | Noguchi et al. | 165/29 |

OTHER PUBLICATIONS

R. E. Critoph, A Forced Convection Regenerative Cycle Using the Carbon–Ammonia Pair in "Proceedings of the Symposium: Solid Sorption Refrigeration," published by the International Institute of Refrigeration, Paris, France, Nov., 1992, pp. 80–85.

Primary Examiner—Henry A. Bennet
Assistant Examiner—William C. Doerrler
Attorney, Agent, or Firm—Speckman, Pauley & Fejer

[57] ABSTRACT

A heat driven solid adsorbent bed heat pump system and method of operating same in which the refrigerant is used both to heat and cool the beds and to heat or cool the space to be conditioned.

18 Claims, 9 Drawing Sheets

5,505,059

DIRECT HEATED ADSORBENT BED HEAT PUMP

BACKGROUND OF THE INVENTION

This invention relates generally to heat pumps using solid adsorbent beds and more particularly to such heat pumps in which the refrigerant for the heat pump loop also serves both to heat and cool the beds.

Heat driven solid adsorbent bed heat pumps have been available for many years. Heretofore, however, the beds were heated with one medium while another medium served as the refrigerant. Such heat driven heat pump systems required some sort of heat exchanger in each of the adsorbent beds to isolate the heating medium from the refrigerant. Examples of these prior art systems are set forth in the following patents:

| U.S. Pat. No. | Issue Date | Inventor |
| --- | --- | --- |
| 1,833,901 | 12/1/31 | Hull |
| 2,024,083 | 12/1935 | Young |
| 2,131,119 | 9/27/38 | Root, et al. |
| 3,007,543 | 11/07/61 | J.L. Maher |
| 3,828,566 | 8/13/74 | Wetzel |
| 4,183,227 | 1/15/80 | Bouvin, et al. |
| 4,548,046 | 10/22/85 | Brandon, et al. |
| 4,610,148 | 9/9/86 | Shelton |
| 4,694,659 | 9/22/87 | Shelton |
| 4,709,558 | 12/01/87 | Matsushita, et al. |
| 4,881,376 | 11/21/89 | Yonezawa, et al. |
| 4,944,159 | 07/31/90 | Crozat |
| 4,976,117 | 12/11/90 | Crozat, et al. |
| 5,005,371 | 04/09/91 | Yonezawa, et al. |
| 5,046,319 | 9/10/1991 | Jones |

The presence of the heat exchanger to maintain the refrigerant separate from the heat exchange fluid significantly reduces the heat transfer rate from the heat exchange fluid to the sorbent. Furthermore, the mass of the heat exchanger itself significantly reduces the heat transfer from the heat exchange fluid to the sorbent since the mass of the heat exchanger must be thermally cycled along with the sorbent material. Both of these factors have a detrimental effect on the performance of the solid adsorbent bed heat pump.

SUMMARY OF THE INVENTION

These and other problems and disadvantages associated with the prior art are overcome by the invention disclosed herein by providing a solid adsorbent heat pump system which eliminates both the bed heat exchangers and the conduits which contain the heat exchange fluid. This is accomplished by using the refrigerant itself as the heating medium to heat the beds. The direct heating concept greatly simplifies the mechanical requirements of the system thereby substantially reducing the design costs, the number of components, and the manufacturing costs for a solid adsorbent heat pump system.

The apparatus of the invention comprises at least one hermetically sealed solid adsorbent bed having a first access opening thereto and a second access opening thereto spaced from the first access opening so that fluid can pass through the bed between the access openings; a refrigerant; and an integrated refrigerant circuit having a heat pump circuit portion and a bed heating and cooling loop connected to the bed through the first and second access openings. The integrated refrigerant circuit serves alternately heat and cool the bed while simultaneously using a portion of the refrigerant passing into and out of the bed to condition a prescribed space such as a home or building. The integrated refrigerant circuit includes a discharge check valve connecting the bed heating loop portion with the condenser in the heat pump circuit portion; and a suction check valve connecting the evaporator in the heat pump circuit portion with the bed cooling loop portion to integrate the circuit. A refrigerant cooler is provided in the bed cooling loop portion which can discharge the heat that must be rejected from the bed heating and cooling loop to drive the compression cycle into the conditioned space or into the ambient atmosphere to maximize the heat recovery for the system. The pumping means providing the pressure differential across the beds may be blowers or ejectors.

The method of the invention is directed to operating a heat pump system with a solid adsorbent bed having an adsorbent capable of adsorbing a refrigerant as the adsorbent is cooled and desorbing the refrigerant as the adsorbent is heated comprising the step of passing a refrigerant through the bed so as to generate a thermal wave in the bed with the refrigerant used, to heat and cool the bed whereby the refrigerant mass flow out of the bed is increased over the refrigerant mass flow into the bed when the bed is being heated, and the refrigerant mass flow out of the bed is decreased over the refrigerant mass flow into the bed when the bed is being cooled.

These and other features and advantages of the invention will become more clearly understood upon consideration of the following detailed description and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
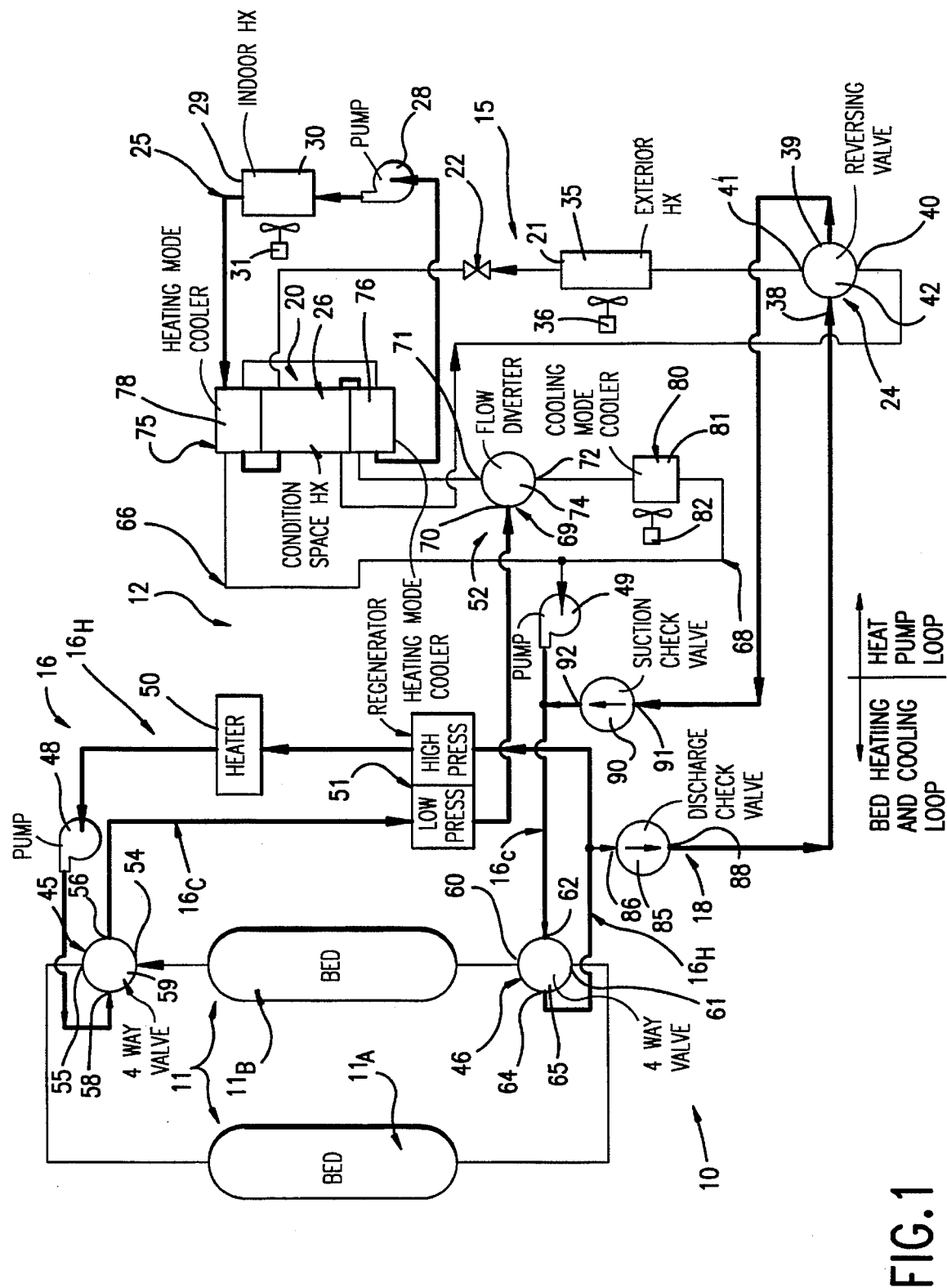
FIG. 1 is a schematic diagram illustrating one embodiment of the invention.

Referring to FIG. 1, the heat pump system 10 embodying the invention includes generally a plurality of adsorbent beds 11 through which a refrigerant is circulated by an integrated refrigerant circuit 12. The refrigerant circuit 12 causes the refrigerant to alternately heat and cool the beds while simultaneously using a portion of the refrigerant passing into and out of the beds 11 to condition the air in a prescribed space as with a typical vapor compression cycle.

The adsorbent beds 11 have only been shown schematically but their construction is simple. Each bed 11 includes a pressure vessel with an elongate tubular enclosure wall closed at its opposite ends to form a hermetically sealed adsorbent receiving chamber that is filled with the adsorbent material being used. Containment screens are placed at each end of the vessel to keep the adsorbent material confined to the vessel as refrigerant flows in and out.

The refrigerant/adsorbent pair selected may be any appropriate pair for adsorption type systems. Some examples are ammonia and activated carbon or zeolite and water. The ammonia/activated carbon pair will be used herein for purposes of illustration but is not meant to be limiting. To permit the beds 11 to be individually identified, one is referenced $11_A$ and the other $11_B$.

The integrated refrigerant circuit 12 includes a heat pump circuit portion 15 and a bed heating and cooling loop 16 integrated together by an integrator portion 18. The circuit portion 15 serves as a typical heat pump circuit to heat or cool the air in the space to be conditioned while the bed heating and cooling loop 16 serves to heat and cool the beds 11 so as to generate thermal waves therein such as those described in U.S. Pat. Nos. 4,610,148 and 4,694,659, which description is incorporated herein by reference. The integrator portion 18 serves to integrate the heat pump circuit portion 15 with the bed heating and cooling loop 16 to form a single refrigerant circuit as will become more apparent. The primary difference between the system disclosed herein and the systems disclosed in U.S. Pat. Nos. 4,610,148 and 4,694,659 is that the refrigerant itself is used to heat and cool the beds as well as provide the heat pump effect.

The heat pump circuit portion 15 includes a conditioned space heat exchange unit 20, an exterior heat exchanger 21, an expansion device 22, and a reversing valve 24. The components in the heat pump circuit portion 15 are connected in typical fashion for a heat pump circuit with the heat exchange unit 20 connected to the heat exchanger 21 through the expansion device 22. The opposite ends of the heat exchange unit 20 and heat exchanger 21 are connected to reversing valve 24 so that high pressure, hot refrigerant can be selectively supplied to either the heat exchange unit 20 or the heat exchanger 21 and the low pressure, cool refrigerant can be selectively received from the heat exchange unit 20 or the heat exchanger 21 discharging same.

The conditioned space heat exchange unit 20 may be used to directly heat or cool the air in the conditioned space, however, it is illustrated as indirectly conditioning the air through a conditioned space heat transfer loop 25 in conjunction with a heat exchanger coil 26. The heat exchanger coil 26 is a refrigerant-to-fluid type so that the heat transfer fluid in the conditioned space heat transfer loop 25 can pass therethrough in counterflow to the refrigerant passing through the coil. The heat transfer loop 25 includes pump means 28 for forcing the heat transfer fluid around the heat transfer loop 25 and a conditioned space air handler 29 for transferring heat between the conditioned space air and the heat transfer fluid. The air handler 29 includes an air-to-fluid heat exchanger coil 30 with a circulating fan 31 for forcing the conditioned space air through the coil 30. The heat transfer fluid is then circulated back through the heat exchanger coil 26 to complete the endless loop.

The exterior heat exchanger 21 may be of any convenient construction without departing from the scope of the invention. It is illustrated as including a refrigerant-to-air coil 35 with an air fan 36 to transfer heat between the ambient air and the refrigerant in well known manner.

The expansion device 22 is a conventional refrigerant expansion device commonly used in conventional heat pumps. It may be an expansion valve or a capillary tube arrangement.

The reversing valve 24 is a conventional 4-way valve used in refrigeration and air conditioning for refrigerant flow reversal in the system. Valve 24 has a first pair of ports 38 and 39 and a second pair of ports 40 and 41 with a valve element 42 that can alternately interconnect ports 38 and 40 while ports 39 and 41 are interconnected or interconnect ports 38 and 41 while ports 39 and 40 are interconnected. The port 40 is connected to that side of the heat exchanger coil 26 opposite the expansion device 22 while the port 41 is connected to the heat exchanger coil 35 opposite the expansion device 22. The function of this valve is to change the circuit from conditioned space heating to conditioned space cooling and vice versa.

The bed heating and cooling loop 16 includes a bed heating loop portion $16_H$ for selectively heating the beds and a bed cooling loop portion $16_C$ for selectively cooling the beds. A hot refrigerant flow reversing valve 45 connects loop portions $16_H$ and $16_C$ to one end of the beds 11, a cold refrigerant flow reversing valve 46 connects loop portions $16_H$ and $16_C$ to the opposite end of the beds 11, and a regenerator 51 transfers heat between the loop portions $16_h$ and $16_C$ to maintain efficiency. The bed heating loop portion $16_H$ has a heater 50 to heat the refrigerant and a high pressure refrigerant pumping means 48 to generate a driving pressure differential across the bed so as to flow the refrigerant through the bed being heated, while the bed cooling loop portion $16_C$ has a refrigerant cooler 52 to cool the refrigerant and a low pressure refrigerant pumping means 49 to generate a driving pressure differential across the bed so as to flow the refrigerant through the bed being cooled.

Each of the refrigerant flow reversing valves 45 and 46 are also 4-way valves. Valve 45 has a first pair of ports 54 and 55 and a second pair of ports 56 and 58 with a valve element 59 that can alternately interconnect ports 54 and 56 while ports 55 and 58 are interconnected or interconnect ports 55 and 56 while ports 54 and 58 are interconnected. Likewise, valve 46 has a first pair of ports 60 and 61 and a second pair of ports 62 and 64 with a valve element 65 that can alternately interconnect ports 60 and 62 while ports 61 and 64 are interconnected or interconnect ports 60 and 64 while ports 61 and 62 are interconnected. Port 54 on valve 45 is connected to one end of bed $11_B$ while port 55 is connected to one end of bed $11_A$ and port 60 on valve 46 is connected to the opposite end of bed $11_B$ while port 61 is connected to the opposite end of bed $11_A$. As will become more apparent, this allows the refrigerant flow through the beds 11 to be reversed at the end of each cooling or heating cycle.

The second port 56 of valve 45 is connected to the inlet of the low pressure side of the regenerator 51 while the second port 58 is connected to the discharge of the high pressure refrigerant pumping means 48. The second port 62 of the valve 46 is connected to the discharge of the low pressure refrigerant pumping means 49 while the second port 64 is connected to the inlet of the high pressure side of the regenerator 51. The outlet from the low pressure side of the regenerator 51 is connected to the inlet of the refrigerant cooler 52 while the outlet from the high pressure side of the regenerator 51 is connected to the inlet of the refrigerant heater 50. The outlet from the refrigerant heater 50 is connected to the intake of the pumping means 48 while the outlet from the refrigerant cooler 52 is connected to the intake of the pumping means 49.

The refrigerant cooler 52 cools the refrigerant in the bed cooling loop portion $16_C$. So that the heat released can be utilized to heat the conditioned space in the space heating mode, the refrigerant cooler 52 includes a heating mode loop 66 connected in the conditioned space heat transfer loop 25 so as to transfer the heat to that loop. The refrigerant cooler 52 also contains a cooling mode loop 68 to discharge the heat to the ambient atmosphere when the heat pump circuit portion 15 is in the cooling mode. A 3-way flow diverter valve 69 alternatively connects the outlet of the low pressure side of the regenerator 51 to the heating mode loop 66 or the cooling mode loop 68, depending on whether space heating or space cooling is being used. The diverter valve 69 has an inlet port 70, a first outlet port 71 connected to the heating mode loop 66, a second outlet port 72 connected to cooling mode loop 68, and a valve element 74 that selectively connects the inlet port 70 to the outlet port 71 or 72.

The heating mode loop 66 includes a heating mode cooler assembly 75 which may be a single refrigerant-to-fluid heat exchanger. However, cooler assembly 75 is illustrated as having a high temperature refrigerant-to-fluid heat exchanger coil 76 located in the conditioned space heat transfer loop 25 on the discharge side of the heat exchanger 26 and a low temperature refrigerant-to-fluid heat exchanger coil 78 located on the inlet side of the heat exchanger 26.

The cooling mode loop 68 includes a cooling mode cooler assembly 80 which discharges the heat from the refrigerant to the ambient atmosphere. The cooler assembly 80 includes a refrigerant-to-air heat exchanger coil 81 and an air circulation fan 82 to force air through the coil 81.

The integrator portion 18 of the integrated refrigerant circuit 12 includes a discharge check valve 85 having its inlet 86 connected to the common point between the outlet port 64 on the valve 46 and the inlet of the high pressure side of the regenerator 51 and its outlet 88 connected to the port 38 on the heat pump reversing valve 24 thus allowing fluid flow only from the bed heating loop portion $16_H$ to the heat pump circuit portion 15. The integrator portion 18 also includes a suction check valve 90 having its inlet 91 connected to the port 39 on the heat pump reversing valve 24 and its outlet 92 connected to the common point between the inlet port 62 on the valve 46 and the discharge from the pumping means 49 thus allowing fluid flow only from the heat pump circuit portion 15 to the bed cooling loop portion $16_C$. The integrator portion 18, then, serves to separate the refrigerant being desorbed in the bed 11 being heated so that it can be supplied to the heat pump circuit portion; and to supply refrigerant from the heat pump circuit portion 15 to the bed 11 for adsorption therein as the bed is being cooled.

System Operation:

FIG. 1 shows the overall system 10 with those portions of the circuits in which the direction of fluid flow remains the same in heavy lines. Basically, the refrigerant flow through all of the bed heating and cooling loop 16 except the beds 11 is always in the same direction, and the fluid flow in the conditioned space heat transfer loop 25 is also always in the same direction. The refrigerant flow through the beds 11 is periodically reversed to cycle the beds through the heating and cooling cycles while the refrigerant flow through the heat pump circuit portion 15 is reversed depending on whether the conditioned space is to be heated or cooled. While the refrigerant flow direction through the cooler 52 does not reverse, it is diverted through the heating mode cooler assembly 75 or the cooling mode cooler assembly 80 depending on the mode of operation of the heat pump circuit portion 15. For sake of illustration, the operation will be described using the ammonia/activated carbon pair, it being understood that any refrigerant/adsorbent pair may be used without departing from the scope of the invention.

Figure 2:
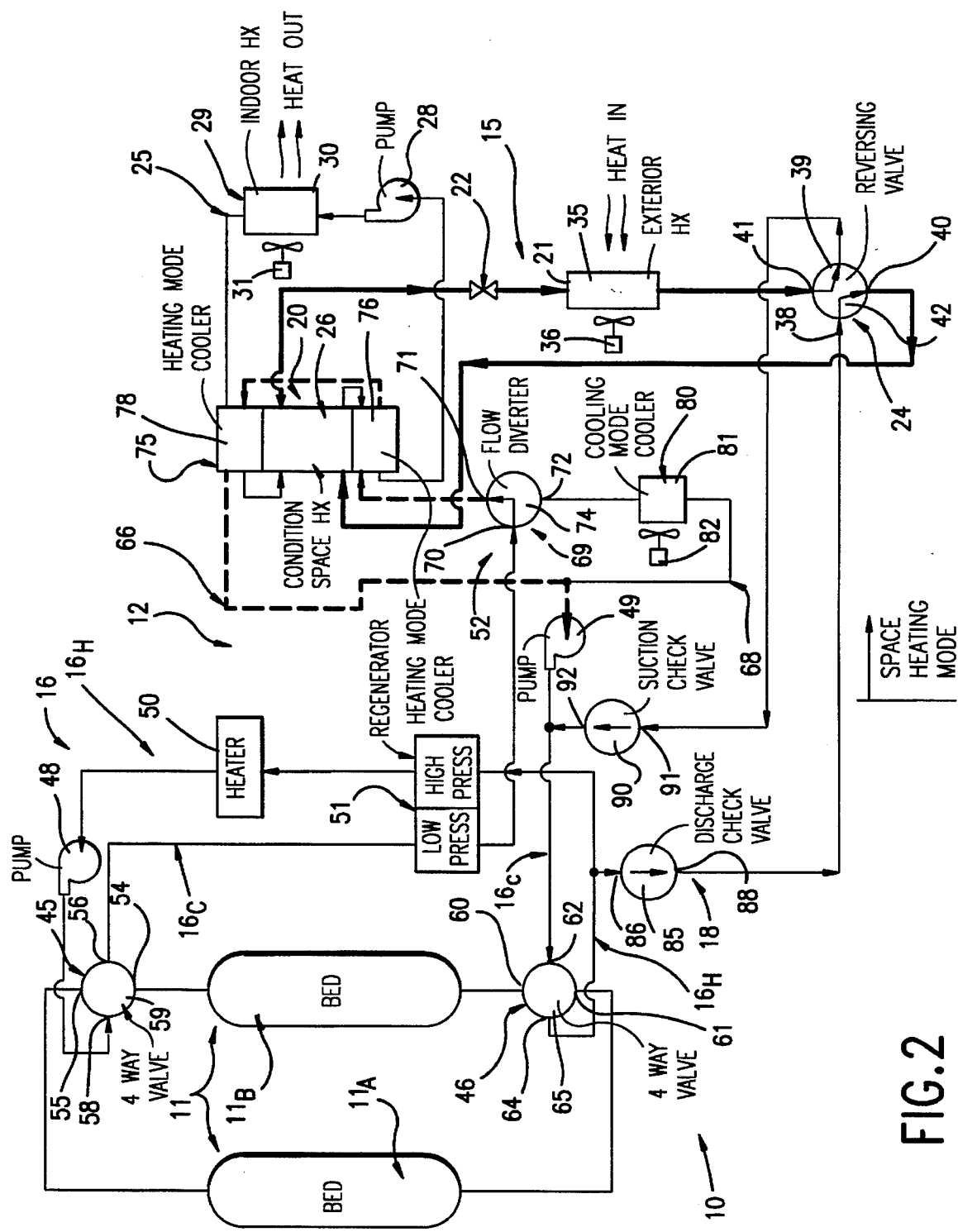
FIG. 2 is the diagram seen in FIG. 1 showing the system in the heat pump heating mode.

FIG. 2 shows the system 10 with the heat pump circuit portion 15 of the integrated refrigerant circuit 12 in the heating mode for the conditioned space. The flow path of the refrigerant in the heat pump circuit portion 15 is shown in solid heavy lines while the flow path of the refrigerant through the cooler 52 is shown in dashed heavy lines. In the space heating mode, the discharged heat from the heat pump circuit portion 15 as well as the discharged heat from the bed heating and cooling loop 16 is used to heat the conditioned space. The reversing of the bed heating and cooling will be described hereinafter since the space conditioning and the bed heating and cooling are independent of each other.

In the space heating mode in FIG. 2, the reversing valve 24 is set so that the inlet port 38 communicates with the port 42 and the port 41 communicates with the outlet port 39 so that hot refrigerant vapor discharged from the bed heating and cooling loop 16 through the check valve 85 is directed into the conditioned space heat exchanger 26 so that it functions as a condenser to discharge heat into the conditioned space through the conditioned space air handler 29. The condensed refrigerant then flows through the expansion device 22 to expand down to evaporator pressure and finally through the exterior heat exchanger 21 acting as the evaporator. The cooled refrigerant vapor at evaporator pressure flows back to the bed heating and cooling loop 16 through the ports 41 and 39 in the reversing valve 24 and the suction check valve 90.

At the same time, hot refrigerant at about 400° F. passing out of the bed being cooled exits the outlet 56 of the hot bed refrigerant reversing valve 45 and passes through the low pressure side of the regenerator 51 to cool the hot refrigerant down to about 150° F. The diverter valve 69 in the cooler 52 is set to divert the flow of this somewhat cooled refrigerant through the heating mode cooler assembly 75 to cool the refrigerant down to about 100° F. whereupon it is returned to the port 62 in the cold refrigerant reversing valve 46 for the beds via the pumping means 49 for recycling through the beds as will become more apparent.

Figure 3:
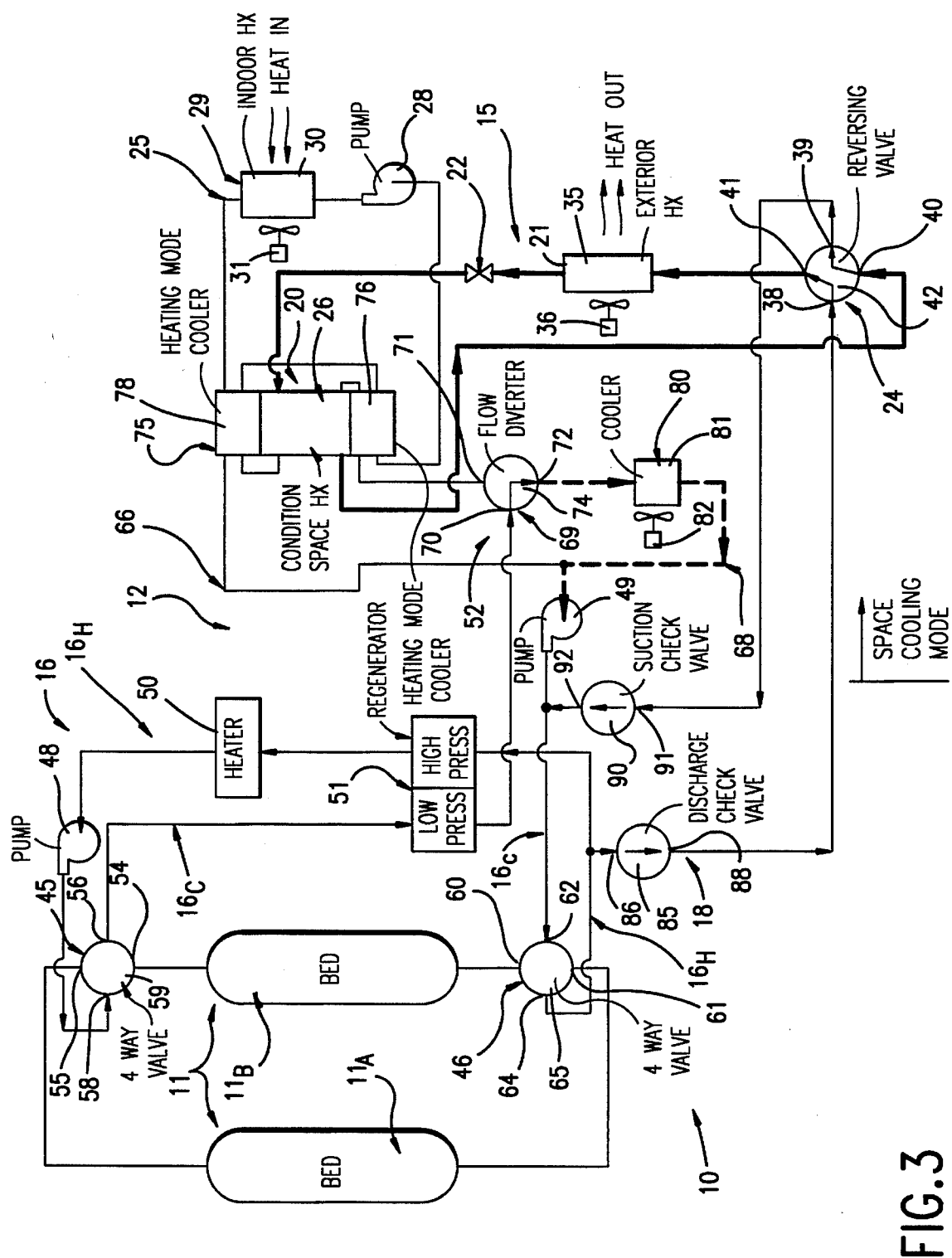
FIG. 3 is the diagram seen in FIG. 1 showing the system in the heat pump cooling mode.

The space cooling mode for the system is shown in FIG. 3. The heat pump reversing valve 24 in the heat pump circuit portion 15 is shifted to reverse the refrigerant flow in the heat pump circuit portion as shown in heavy solid lines. This causes the conditioned space heat exchange unit 20 to become the evaporator while the exterior heat exchanger 21 becomes the condenser. Thus, the conditioned space is now cooled since the evaporator is in the conditioned space heat transfer loop 25. The refrigerant flow as shown in heavy dashed lines through the refrigerant cooler 52 is changed by shifting the diverter valve 69 so that the hot refrigerant now passes through the cooling mode cooler assembly 80 rather than the heating mode cooler assembly 75. This diverts the heat from the refrigerant to the outside ambient atmosphere rather than to the conditioned space.

As was explained in earlier U.S. Pat. Nos. 4,610,148 and 4,694,659 and incorporated herein by reference, the cooling of the medium such as by the cooler 52 used to heat and cool the beds allows the system to continue to operate. The low pressure refrigerant pumping means 49 adds just enough pressure to the returning refrigerant from the cooler 52 to force the refrigerant through the beds at the required velocity to generate the thermal wave in the beds as will be appreciated from the aforementioned patents. In the present invention, the refrigerant exiting and entering the beds is in its vapor stage rather than the heat transfer liquid disclosed in the earlier patents. As will be further explained, a pressure increase of about 1–2 psig should be sufficient to generate the necessary refrigerant flow through the beds to establish the required thermal waves and transfer sufficient heat to adsorb and desorb the refrigerant.

It will be appreciated that the entire bed cooling loop portion $16_C$ has a fixed volume so that, as the bed 11 in the cooling mode is cooled and refrigerant is adsorbed, the loop portion pressure drops, with the pumping means 49 only adding about 1–2 psig to the incoming refrigerant pressure. Eventually, the pressure in the bed cooling loop portion $16_C$ drops below the evaporator pressure to cause refrigerant flow from the heat exchanger 21 acting as the evaporator via the check valve 90 into the bed cooling loop portion $16_C$. The refrigerant from the evaporator is eventually adsorbed by the adsorbent in the bed 11 being cooled. Thus, the mass flow of the refrigerant into the bed being cooled will be greater than the mass flow out once the bed pressure is lowered to evaporator pressure.

In the meantime, a similar sequence is occurring in the bed heating loop portion $16_H$ of the refrigerant circuit 12. Cooled high pressure refrigerant at about 125° F. passing out of the bed 11 being heated exits the port 64 of the cold refrigerant flow reversing valve 46 and passes through the high pressure side of the regenerator 51 to be heated up to about 375° F. by the hot refrigerant in the low pressure side of regenerator 51 in counterflow fashion to the flow in the low pressure side. This reheated refrigerant from the regenerator 51 passes through the heater 50 to be heated up to about 425° F. and then passes through the hot pumping means 48 to generate the 1–2 psig necessary to force the heated refrigerant through the bed 11 being heated while generating the required thermal wave.

It will also be appreciated that the entire bed heating loop portion $16_H$ has a fixed volume so that, as the bed 11 in the heating mode is heated and refrigerant is desorbed, the loop portion pressure increases, with the pumping means 48 only adding about 1–2 psig to the incoming refrigerant pressure. Eventually, the pressure in the bed heating loop portion $16_H$ rises above the condenser pressure to cause refrigerant flow from the bed heating portion $16_H$ into the heat exchanger 26 in the heat pump circuit portion 15 acting as the condenser via the check valve 85. Thus, the mass flow of the refrigerant out of the bed being heated will be greater than the mass flow in once the bed pressure is raised to condenser pressure.

It is the change in the mass flow rate into and out of the beds 11 that is used to supply the refrigerant to the heat pump circuit portion 15 and to drive the refrigerant around the heat pump circuit portion 15. The amount of heat removed from or added to the space being conditioned is controlled by the difference in the mass of refrigerant into and out of the bed during any cycle.

Figure 4:
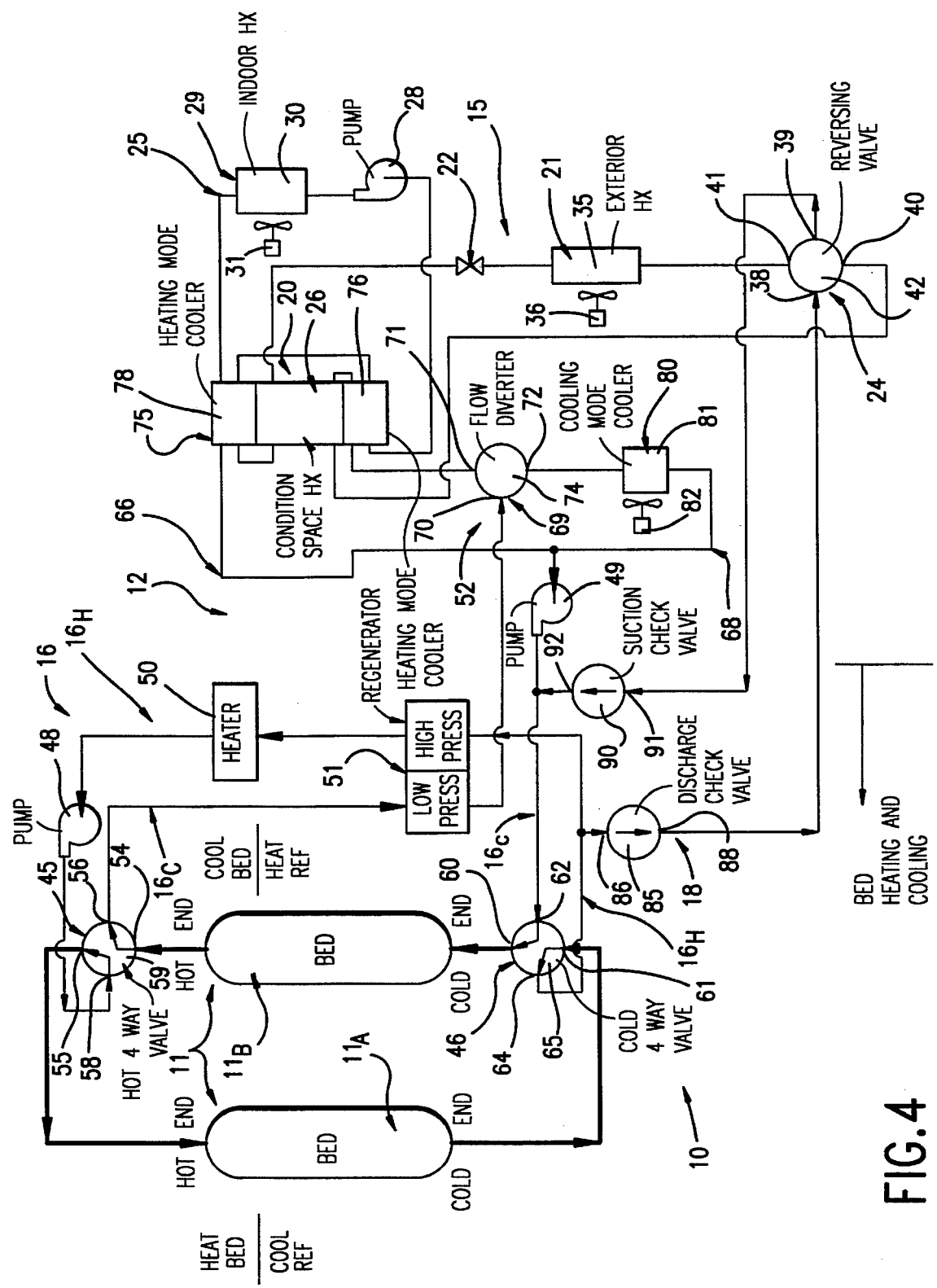
FIG. 4 is the diagram seen in FIG. 1 showing one of the beds in the heating cycle and the other of the beds in the cooling cycle for the system.
Figure 5:
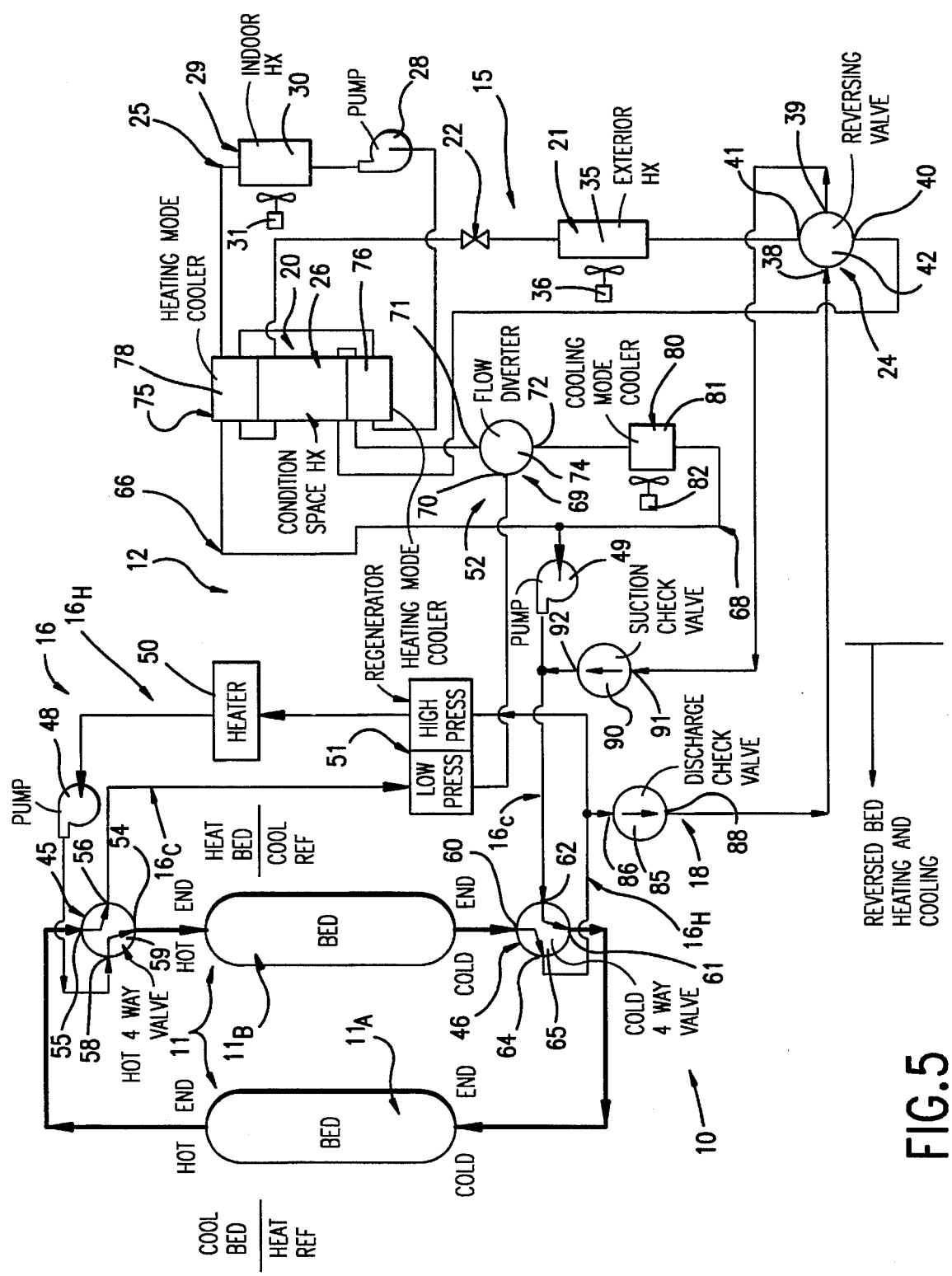
FIG. 5 is the diagram seen in FIG. 1 showing the other of the beds in the heating cycle while the first bed is in the cooling cycle for the system.

FIGS. 4 and 5 shows the bed heating and cooling operation for the system 10. As will be understood from the disclosure in U.S. Pat. Nos. 4,610,148 and 4,694,659 incorporated herein by reference, the adsorbent in each bed 11 will be heated as the refrigerant passing therethrough is being cooled and vice versa. FIG. 4 shows the adsorbent in bed $11_A$ being heated while the adsorbent in bed $11_B$ is being cooled; and FIG. 5 shows the adsorbent in bed $11_A$ being cooled while the adsorbent in bed $11_B$ is being heated. To cycle the beds 11, the direction of refrigerant flow through the beds 11 is simply reversed. A complete cycle according to the disclosure of this application is considered both a heating and cooling of the bed. Thus, the bed heating is one half cycle and the bed cooling is the other half cycle of the complete cycle. Thus, the operation of the heat pump circuit portion 15 in the integrated refrigerant circuit 12 is independent of the bed heating and cooling loop 16. The concept is equally valid for a four-bed design.

An understanding of the bed heating and cooling operation can be explained by starting at some point in the cycle. For purposes of illustration, the explanation will start at that point in the cycle where the refrigerant pressure in the two beds $11_A$ and $11_B$ have equalized and the next half cycle has just started.

As shown in FIG. 4, bed $11_A$ is being heated while bed $11_B$ being cooled. The reversible refrigerant flow paths in the bed heating loop portion $16_H$ and the bed cooling loop portion $16_C$ are shown in heavy solid lines. The hot refrigerant reversing valve 45 is set so that the port 54 is connected to the port 56 while the port 55 is connected to port 58 in order that the refrigerant from the heater 50 at about 425° F. flows into the bed $11_A$ through pumping means 48 while the hot refrigerant exiting the bed $11_B$ is directed to the inlet of the low pressure side of the regenerator 51. The cold refrigerant reversing valve 46 is set so that the port 61 is connected to the port 64 while the port 60 is connected port 62 in order that the integrated refrigerant from the refrigerant cooler 52 via pumping means 49 and from the evaporator in the heat pump circuit portion 15 via check valve 90 at about 100° F. flows into the bed $11_B$ at that end opposite the hot refrigerant outlet while the cooled refrigerant exiting the bed $11_A$ is directed to the inlet of the high pressure side of the regenerator 51 and also to the condenser in the heat pump circuit portion 15 via check valve 85. This generates a thermal wave in the beds 11 as the adsorbent is heated or cooled in accordance with the teachings of U.S. Pat. Nos. 4,610,148 and 4,694,659. At the end of the half cycle when the thermal waves reach the opposite end of the beds, the refrigerant flow is reversed as will be explained.

Before the refrigerant flow is reversed, however, the beds 11 are interconnected so that the pressures in both beds can equalize. During the cycle operation shown in FIG. 4, bed $11_A$ will be at the higher condenser pressure plus the pump differential while the bed $11_B$ will be at the lower evaporator pressure plus the pump differential. For the ammonia/carbon pair the condenser pressure is about 250 psig while the evaporator pressure is about 60 psig in the cooling mode and about 0–50 psig in the heating mode. By allowing the bed pressures to equalize, the amount of work input necessary to shift the pressures between evaporator and condenser pressures is minimized. The design illustrated can easily accommodate this pressure equalization without additional valves. This is accomplished by shifting the cool valve 46 at the end of a half cycle while the hot valve 45 is not shifted. This connects the outlet of the bed just heated to the inlet of the bed just cooled so that the bed pressures can equalize.

After bed pressure equalization, the hot valve 45 is also shifted so the effective flow of refrigerant through the beds 11 is reversed as seen in FIG. 5. Again, the reversible refrigerant flow paths in the bed heating loop portion $16_H$ and cooling loop portion $16_C$ are shown in heavy solid lines. The valve 45 is set so that the port 54 is connected to the port 58 while the port 55 is connected port 56 in order that the refrigerant from the heater 50 at about 425° F. flows into the bed $11_B$ through pumping means 48 while the hot refrigerant exiting the bed $11_A$ is directed to the inlet of the low pressure side of the regenerator 51. The cold refrigerant reversing valve 46 is set so that the port 61 is connected to the port 62 while the port 60 is connected port 64 in order that the integrated refrigerant from the refrigerant cooler 52 via pumping means 49 and from the evaporator in the heat pump circuit loop 15 via check valve 90 at about 100° F. flows into the bed $11_A$ at that end opposite the hot refrigerant outlet while the cooled refrigerant exiting the bed $11_B$ is directed to the inlet of the high pressure side of the regenerator 51 and also to the condenser in the heat pump circuit portion 15 via check valve 85. This generates a thermal wave in the beds 11 moving in the opposite direction as the adsorbent is heated or cooled in accordance with the teachings of U.S. Pat. Nos. 4,610,148 and 4,694,659. At the end of the half cycle when the thermal waves reach the opposite end of the beds, bed pressure equalization is accomplished by shifting valve 46 while valve 45 is not shifted, and then the refrigerant flow is reversed by also shifting the valve 45 to repeat the first described half cycle.

With the absence of the steel tubing in the beds necessary to contain a liquid heat exchange fluid, the amount of heat which must be transferred to and from the heat exchange fluid (here, the refrigerant) in the beds 11 is greatly reduced. For a three ton cooling machine operating between 100° F. and 425° F., this has been estimated to be approximately 100,000 Btu/hr. Because of direct contact with the carbon, it is estimated that ammonia entering at only 425° F. will have about the same carbon heating ability as a separate heat exchange fluid entering at 500° F. For simplicity, it is assumed the temperature rise or fall of the ammonia vapor passing through the beds is about 300° F. In the actual case, there is adsorption or desorption which affects the mass flow rates and vapor temperatures. Under average conditions this will require the circulation of 600 lbm/hr in each bed. Rough calculations for pressure drops through packed beds show that if properly designed (correct cross-section, length and particle diameter), the pressure drop can be much less than 1 psig for the 600 lbm/hr flow rate. Because the refrigerant vapor (here, ammonia) is in direct contact with the adsorbent particles (here, carbon) and because the adsorbent particles have an extremely high surface area, the overall heat transfer rates will be significantly higher than with the liquid heat exchange fluid separated from the adsorbent by a metal tube.

For purposes of illustration and explanation only, pumping means 48 and 49 are considered constant volume flow rate devices, it being understood that such pumping means need not be so limited and still come within the scope of the invention. Typically the low pressure pumping means 49 will be larger (have higher volume flow capacity) than the high pressure pumping means 48 because the refrigerant density in the low pressure bed cooling loop portion $16_C$ is much lower than that in the high pressure bed heating loop portion $16_H$. Likewise, the volumes of the bed heating loop portion $16_H$ and bed cooling loop portion $16_C$ are substantially fixed although the individual volumes of the loop portions are different so that the corresponding masses of refrigerant match as will become more apparent. FIGS. 6A–6F relate the bed mass flow rates, the bed pressure, and the heat pump circuit portion mass change as a function of time for a corresponding complete cycle in the two beds. Initially in the figures, bed $11_A$ is being cooled and bed $11_B$ is being heated.

Figure 6A:
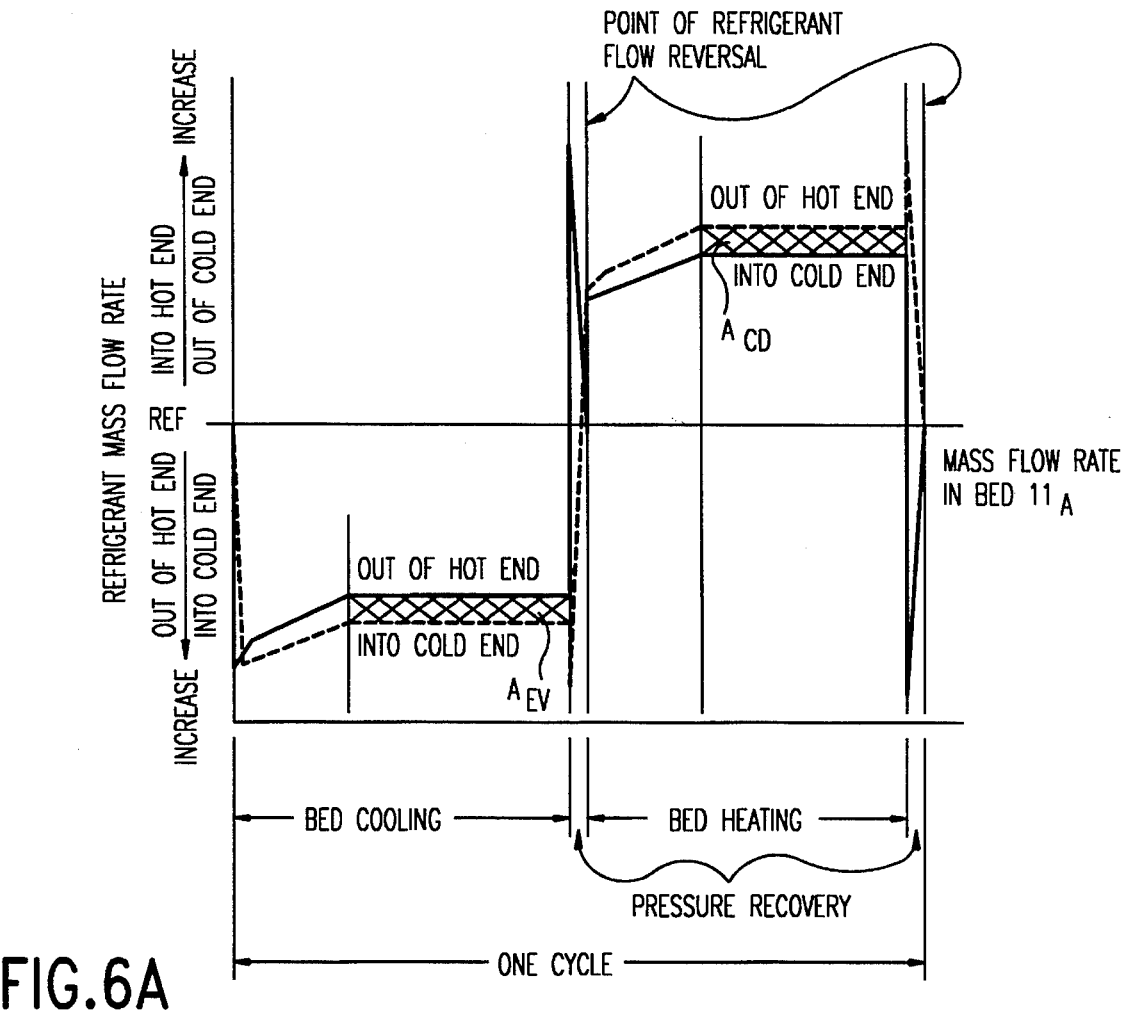
FIGS. 6A–6F are a set of diagrams schematically illustrating the system refrigerant flow creating the heat pump effect; and, FIG. 7 is a schematic diagram illustrating a second embodiment of the invention.

The cycle for bed $11_A$ will be described with reference to FIGS. 6A–6C, starting just after the bed pressure equalization has been completed, where bed $11_A$ is cooled for the first half cycle and then heated for the second half cycle with bed pressure equalization taking place between each half cycle. It should be noted that, because the refrigerant flow through the bed is reversed, one end of the bed remains in the vicinity of the hotter temperature while the opposite end of the bed remains in the vicinity of the cooler temperature. FIG. 6A charts the refrigerant mass flow into and out of bed $11_A$ during the cycle, FIG. 6B charts pressure in bed $11_A$ during the corresponding cycle, and FIG. 6C charts that part of the refrigerant mass flow rate to and from the heat pump circuit portion 15 associated with bed $11_A$. To simplify charting with the reversing refrigerant flow in the beds in FIGS. 6A and 6D, a reference line is used with the refrigerant flow into the hot end of the bed and refrigerant flow out of the cold end of the bed increasing above the line while the refrigerant flow out of the hot end of the bed and refrigerant flow into the cold end of the bed increases below the line, During the first half cycle, the bed $11_A$ is connected to the bed cooling loop portion $16_C$ as seen in FIG. 5 with the bed at the pressure intermediate condenser and evaporator pressure. Initially, the refrigerant flowing into the bed serves to further depressurize the bed by cooling it. The refrigerant mass flow rate into bed $11_A$ is greater than that exiting the bed by the rate at which the bed is adsorbing refrigerant. As refrigerant is adsorbed by the bed adsorbent (carbon) in this fixed volume bed and bed cooling loop portion combination, the mass flow rates into and out of bed $11_A$ drop at substantially the same rate until the evaporator pressure is reached even though the volumetric flow rate remains constant. This drop in mass flow rate is due solely to the change in pressure with the corresponding change in refrigerant density. During this time, no refrigerant is flowing from the heat pump circuit portion 15 into the bed cooling loop portion $16_C$ because the pressure differential between the bed cooling loop portion $16_C$ and the heat pump circuit portion 15 keeps refrigerant from flowing through the check valve 90. Once evaporator pressure is reached, the mass flow rate into and out of the bed and the bed pressure level off to reach a steady state condition. This state continues until the end of the half cycle.

At the end of the half cycle, the beds $11_A$ and $11_B$ are directly connected so that pressure equalization can take place. During this pressure equalization, some refrigerant will flow between the beds with the flow being from bed $11_B$ (the higher pressure bed) into bed $11_A$ (the lower pressure bed) as the pressures equalize at a point between evaporator pressure and condenser pressure. Because both ends of the beds are connected to each other, refrigerant will flow from both ends of bed $11_B$ into both ends of bed $11_A$. In other words, the refrigerant flow into the hot end of bed $11_A$ reverses as shown in FIG. 6A. It will be noted that the mass flow rates are higher at this time than during the cooling or heating half cycle. During this time, no refrigerant flows into or out of the heat pump circuit portion 15.

After pressure equalization, the flow of refrigerant through the beds is reversed at which time heating of bed $11_A$ begins with bed $11_A$ now connected to the bed heating loop portion $16_H$. Initially, the refrigerant flowing into the bed serves to further pressurize the bed by heating it. The refrigerant mass flow rate into bed $11_A$ is less than that exiting the bed by the rate at which the bed is desorbing refrigerant. As refrigerant is desorbed by the bed adsorbent (carbon) in this fixed volume bed and bed heating loop portion combination, the mass flow rates into and out of bed $11_A$ rise at substantially the same rate until the condenser pressure is reached even though the volumetric flow rate remains constant. This rise in mass flow rate is due solely to the change in pressure with the corresponding change in refrigerant density. During this time, no refrigerant is flowing from the bed heating loop portion $16_H$ into the heat pump circuit portion 15 because the pressure differential between the bed heating loop portion $16_H$ and the heat pump circuit portion 15 keeps refrigerant from flowing through the check valve 85. Once condenser pressure is reached, the mass flow rate into and out of the bed and the bed pressure level off to reach a steady state condition. This state continues until the end of the half cycle.

At the end of this half cycle, the beds $11_A$ and $11_B$ are again directly connected so that pressure equalization can take place. During this pressure equalization, some refrigerant will flow between the beds with the flow now being from bed $11_A$ (the higher pressure bed) into bed $11_B$ (the lower pressure bed) as the pressures equalize at a point between evaporator pressure and condenser pressure. Because both ends of the beds are again connected to each other, refrigerant will now flow from both ends of bed $11_A$ into both ends of bed $11_B$. In other words, the refrigerant flow out of the cold end of bed $11_A$ reverses as shown in FIG. 6A. Like the first pressure equalization period, the mass flow rates are higher at this time than during the cooling or heating half cycle. During this time, no refrigerant flows into or out of the heat pump circuit portion 15.

This completes one complete cycle of bed $11_A$. The cycle is then repeated.

After reaching steady-state operation, the mass of refrigerant received from the evaporator in the heat pump circuit portion 15 during a cycle must equal that sent to the condenser in the circuit portion during that cycle. In FIG. 6A–6C, the mass of refrigerant from the evaporator into bed $11_A$ is shown by the area $A_{EV}$ between the incoming and discharging curves during the bed cooling half cycle and the mass of refrigerant to the condenser is shown by the area $A_{CD}$ between the incoming and discharging curves during the bed heating half cycle. These masses represent the heat pump effect produced by the bed $11_A$ of the system.

The corresponding cycle for bed $11_B$ will be described with reference to FIG. 6D–6F where bed $11_B$ is heated for the first half cycle and then cooled for the second half cycle with bed pressure equalization taking place between each half cycle. FIG. 6D charts the refrigerant mass flow into and out of bed $11_B$ during the cycle, FIG. 6E charts pressure in bed $11_B$ during the corresponding cycle, and FIG. 6F charts that part of the refrigerant mass flow to and from the heat pump circuit portion 15 associated with bed $11_B$. So that the two beds operate together, the first half cycles occur together and the second half cycles occur together.

During the first half cycle the refrigerant flowing into the bed $11_B$ initially serves to further pressurize the bed by heating it. The refrigerant mass flow rate into bed $11_B$ is less than that exiting the bed by the rate at which the bed is desorbing refrigerant. As refrigerant is desorbed by the bed adsorbent (carbon) in this fixed volume bed and bed heating loop portion combination, the mass flow rates into and out of bed $11_B$ rise at substantially the same rate until the condenser pressure is reached even though the volumetric flow rate remains constant. This rise in mass flow rate is due solely to the change in pressure with the corresponding change in refrigerant density. During this time, no refrigerant is flowing from the bed heating loop portion $16_H$ into the heat pump circuit portion 15 because the pressure differential between the bed heating loop portion $16_H$ and the heat pump circuit portion 15 keeps refrigerant from flowing through the discharge check valve 85. Once condenser pressure is reached, the mass flow rate into and out of the bed and the bed pressure level off to reach a steady state condition. This state continues until the end of the half cycle.

At the end of this half cycle, the beds $11_A$ and $11_B$ are directly connected as noted above so that pressure equalization can take place. During this pressure equalization, refrigerant flows from both ends of bed $11_B$ (the higher pressure bed) into bed $11_A$ (the lower pressure bed) as the pressures equalize at a point between evaporator pressure and condenser pressure. During this time, no refrigerant flows into or out of the heat pump circuit portion. 15.

After this pressure equalization, the flow of refrigerant through the beds is reversed at which time cooling of bed $11_B$ begins with bed $11_B$ now connected to the bed cooling loop portion $16_C$. Initially, the refrigerant flowing into the bed serves to further depressurize the bed by cooling it. The refrigerant mass flow rate into bed $11_B$ is greater than that exiting the bed by the rate at which the bed is adsorbing refrigerant. As refrigerant is adsorbed by the bed adsorbent (carbon) in this fixed volume bed and bed cooling loop portion combination, the mass flow rates into and out of bed $11_B$ drop at substantially the same rate until the evaporator pressure is reached even though the volumetric flow rate remains constant. This drop in mass flow rate is due solely to the change in pressure with the corresponding change in refrigerant density. During this time, no refrigerant is flowing from the heat pump circuit portion 15 into the bed cooling loop portion $16_C$ because the pressure differential between the bed cooling loop portion $16_C$ and the heat pump circuit portion 15 keeps refrigerant from flowing through the check valve 90. Once evaporator pressure is reached, the mass flow rate into and out of the bed and the bed pressure level off to reach a steady state condition. This state continues until the end of the half cycle.

At the end of the half cycle, the beds $11_A$ and $11_B$ are again directly connected so that pressure equalization can take place. During this pressure equalization, refrigerant flows from both ends of bed $11_A$ (the higher pressure bed) into both ends of bed $11_B$ (the lower pressure bed) as the pressures equalize at a point between evaporator pressure and condenser pressure. During this time, no refrigerant flows into or out of the heat pump circuit portion 15. This completes one complete cycle of bed $11_B$. The cycle is then repeated.

Figure 6B:
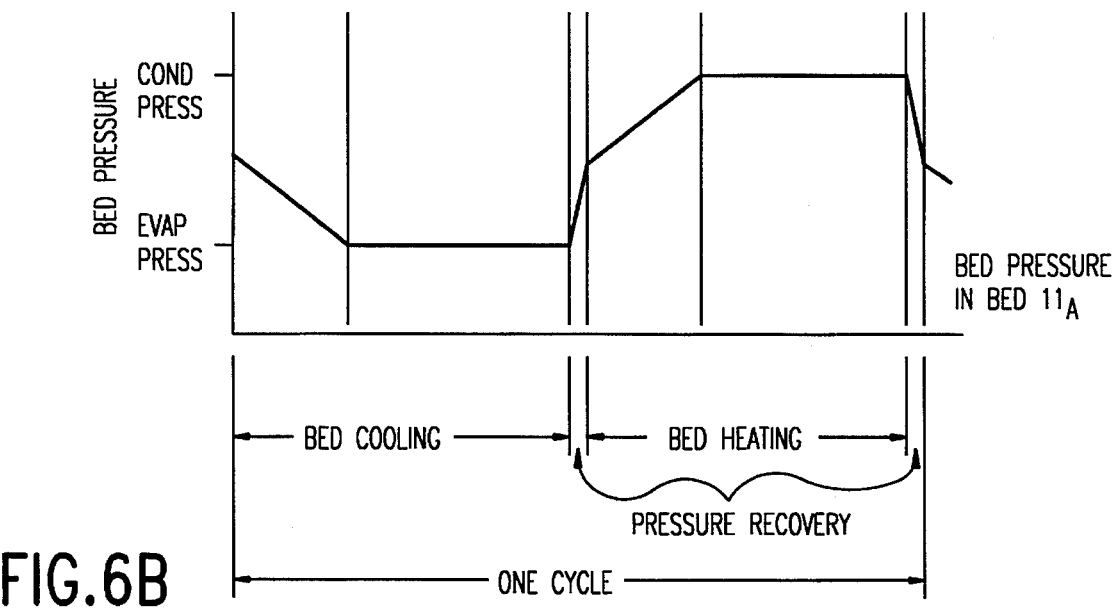
Figure 6C:
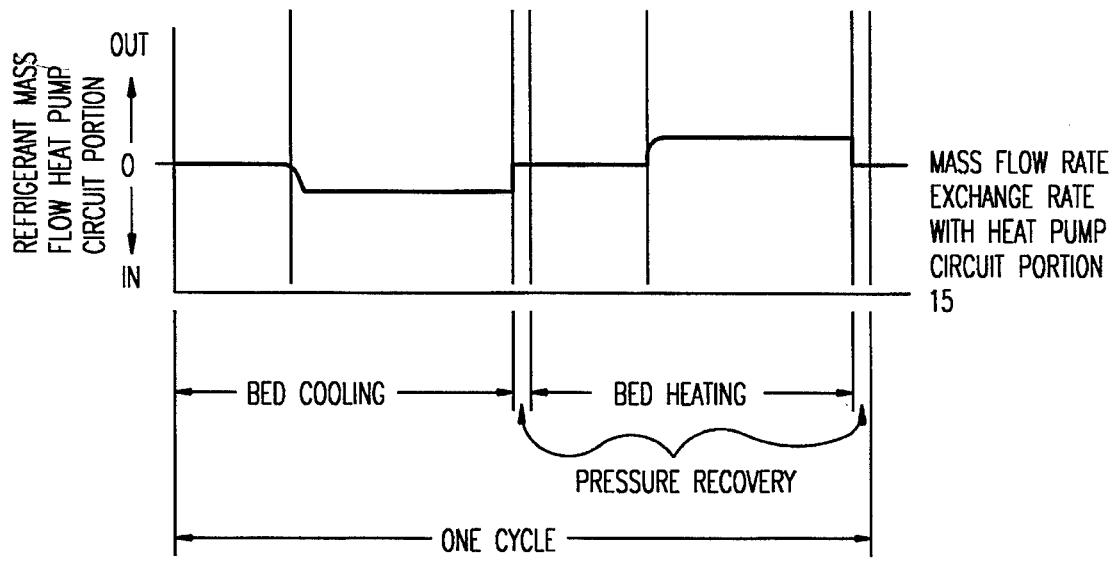
Figure 6D:
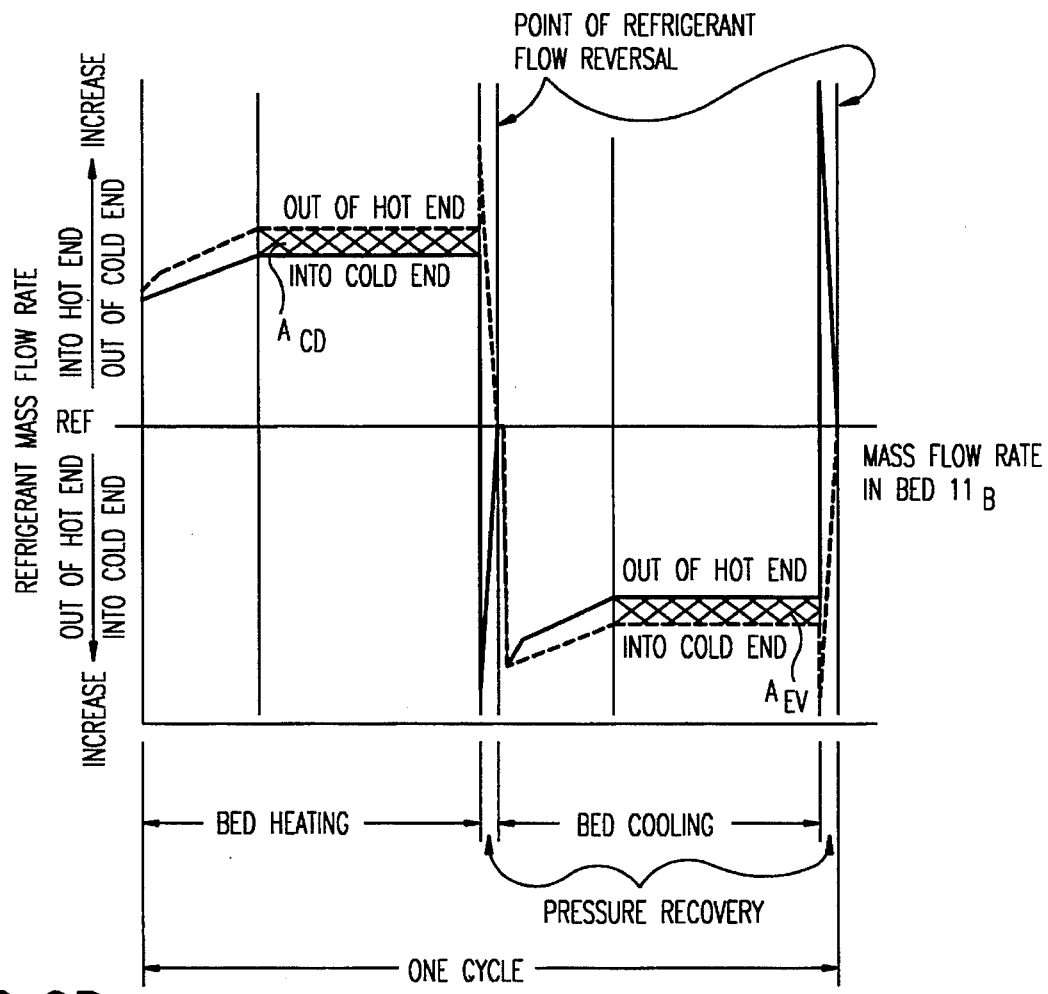
Figure 6E:
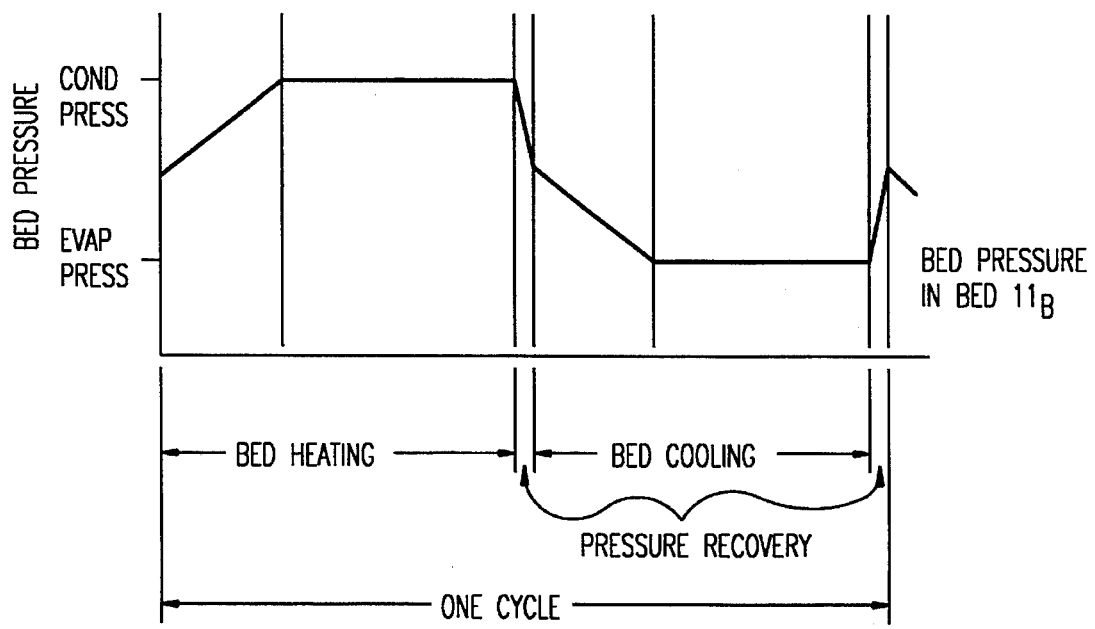
Figure 6F:
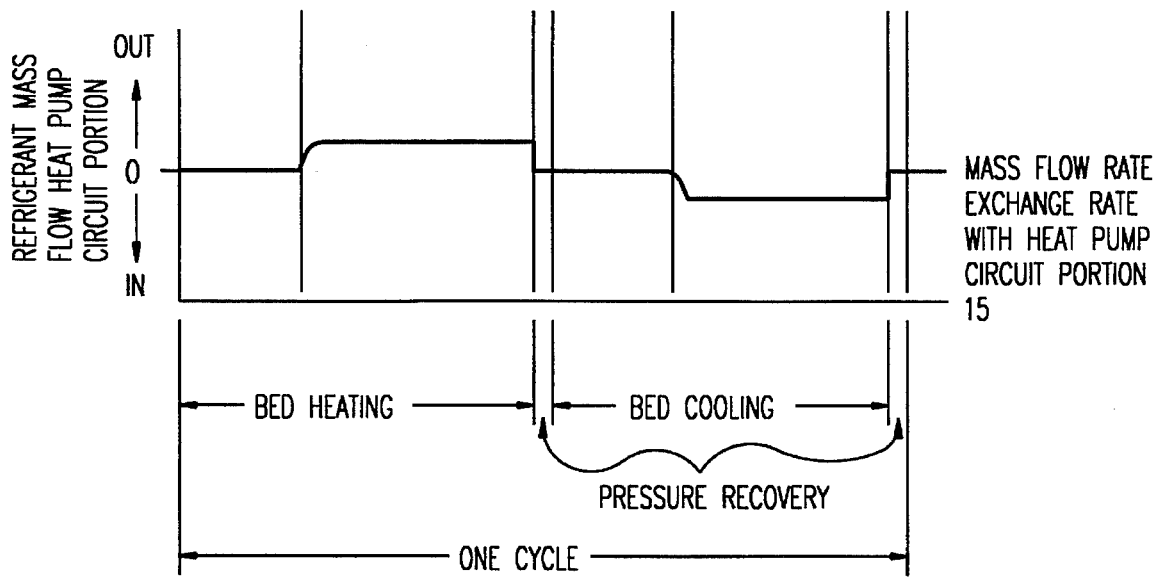

Since the mass of refrigerant received from the evaporator in the heat pump circuit portion 15 during a cycle must equal that sent to the condenser in the circuit portion during that cycle, the mass of refrigerant to the condenser is shown by the area $A_{CD}$ between the incoming and discharging curves during the bed heating half cycle in FIGS. 6A–6C, and the mass of refrigerant from the evaporator into bed $11_B$ is shown by the area $A_{EV}$ between the incoming and discharging curves during the bed cooling half cycle. These masses represent the heat pump effect produced by the bed $11_B$ of the system. The total of the heat pump effect of the two beds is the sum of the corresponding areas in FIGS. 6A and 6D. In other words, the cooling effect is the sum of areas $A_{EV}$ while the heating effect is the sum of areas $A_{CD}$.

As seen in FIGS. 6A–6F, the mass flow rates and pressures for bed $11_B$ and heat pump circuit portion mass flow are the same as those for bed $11_A$ except that the curves are shifted in time by one-half cycle. It will be appreciated that the teachings of the invention can be applied to a single bed system without departing from the scope of the invention. Such a system would intermittently supply refrigerant to and receive refrigerant from the heat pump circuit portion 15. Likewise, it is not necessary that the two beds operate with the same cycle time but such operation is the most efficient.

The refrigerant is in its vapor state when it passes through the regenerator 51. Calculations have also been done for the sizing of the regenerator 51. Under average conditions and using a plate type heat exchanger model with a spacing between plates of about ⅛", heat transfer coefficients on the order of 80–90 BTU/hr-ft$^2$-F. per side are attainable at acceptable pressure drops. For the 250° F. temperature drop indicated, this would require a surface area of approximately 95 ft.² for a 3 ton unit. The material in the external regenerator is not thermally cycled.

Pumping Means Options:

A significant design challenge lies in affecting the small pressure rise necessary to circulate the refrigerant in an oil-free environment so as not to contaminate the adsorbent, especially when the adsorbent is highly adsorbent carbon particles. The pumping means 48 and 49 are illustrated as blowers in FIGS. 1–5 and must be leak-tight. A magnetically coupled blower wheel or a "canned drive" constructed similarly to a canned-rotor pump can be used for the pumping means. Since the refrigerant loops must remain oil free when ammonia is used, gas bearings may be used to eliminate the oil.

It is also possible to circulate the refrigerant vapor in the integrated refrigerant circuit 12 using ejectors as the pumping means. These devices are also referred to as aspirators or eductors and are commonly used in steam-jet refrigeration. There are no moving parts and the pressure rise is obtained by the momentum exchange between a high velocity stream of vapor and the stream in the ammonia loop. For an ejector substitution of the blowers as the pumping means and designated generally 148 and 149, see FIG. 7.

Rough calculations have been done to show the feasibility of such a device to provide the "blower" function. For example, at Mach number (M)=0.6 in the nozzle, a pressure rise of 0.8 psi can be obtained with a mass flow ratio of 20:1 (loop entering flow rate÷jet flow rate). The M=0.6 condition would require that the jet originate from a pressure source 35 psi higher than that of the loop.

Figure 7:
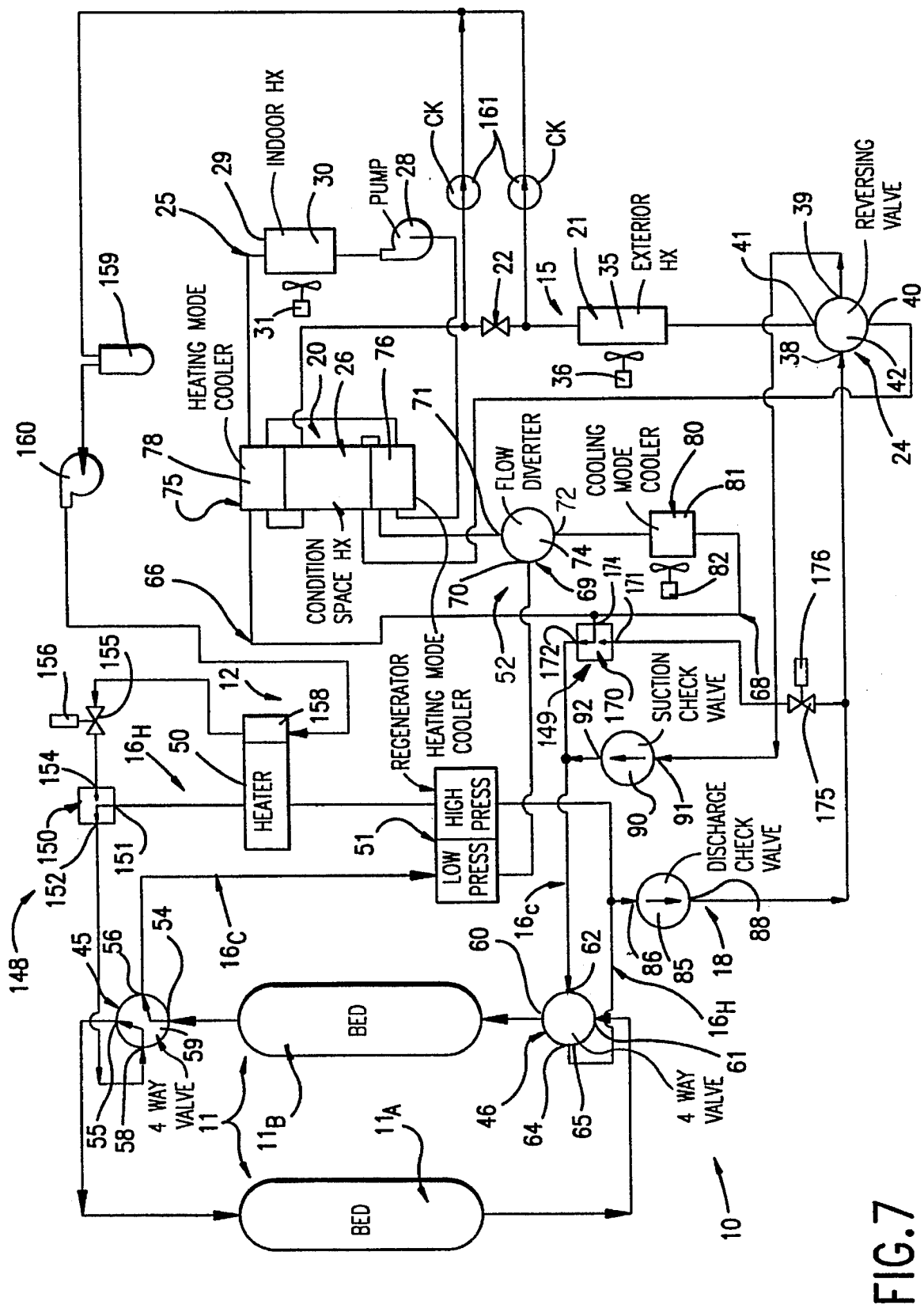

As shown in FIG. 7, the pumping means 148 includes an ejector 150 with an primary inlet 151, an outlet 152, and an ejector inlet 154. The refrigerant to the ejector inlet 154 is controlled by a modulating high pressure flow control valve 155 with controller 156. The high pressure vapor to power the ejector 150 is provided by a vaporizer coil 158 on the heater 50 supplied from a liquid refrigerant receiver 159. A liquid refrigerant pump 160 is provided in the line between the receiver 159 and the vaporizer coil 158 to provide the necessary pressure and flow to power the ejector. In order to start the system and establish a pressure source for the ejector jets, the system must be designed such that liquid will always be present in the heat pump liquid receiver 159. The receiver 159 remains connected to condensate refrigerant in the circuit portion 15 via check valves 161 across the expansion device 22. During operation, the receiver 159 will be at condensing pressure and when not operating the system will be at some equilibrium intermediate pressure.

At start-up, the small magnetically coupled or canned rotor pump 160 with a 35 psig pressure rise capability pumps liquid ammonia from the receiver 159 through vaporizer coil 158 exposed to the flue gas exiting the ammonia heater 50. The flow rate of the vapor is controlled by the high pressure flow control valve 155 to produce the desired flow rate in the bed heating loop portion 16$_H$ of the refrigerant circuit. Note that the pump will always provide the ejector pressure source 35 psi above the loop pressure. In fact, once the condenser pressure has been established, there will be sufficient pressure available during most of the bed pressurization to allow the pump to "free-wheel".

As shown in FIG. 7, the pumping means 149 includes an ejector 170 with an primary inlet 171, an outlet 172, and an ejector inlet 174. The refrigerant to the ejector inlet 174 is controlled by a modulating low pressure flow control valve 175 with controller 176. The high pressure vapor to power the ejector 170 is provided directly from the high pressure outlet port 64 on the cold valve 46.

The refrigerant vapor flow is therefore accomplished using a small pump (30 lbm/hr @ 35 psi=2 fluid watts) and by "sacrificing" approximately 5% of the ammonia compressed and condensed. This same 30 lbm/hr of ammonia taken from the condenser to operate the ejector 150 momentarily adds mass to the high pressure ammonia loop. However, a similar amount is being extracted from this loop to operate the ejector 170.

What is claimed as invention is:

1. A heat pump system for conditioning a prescribed space comprising:

at least two hermetically sealed solid adsorbent beds, each of said beds having a first access opening thereto and a second access opening thereto spaced from said first access opening so that fluid can pass through said bed between said access openings:

a refrigerant:

an integrated refrigerant circuit having a heat pump circuit portion and a bed heating and cooling arrangement including a bed heating portion and a bed cooling portion connected to both of said beds through said first and second access openings for heating and cooling said refrigerant for alternately heating and cooling said beds so as to cool one of said beds while the other of said beds is heated while simultaneously using a portion of the refrigerant passing into and out of said beds to condition the prescribed space, and wherein said integrated heat pump circuit and heating loop is further constructed and arranged to cause the refrigerant to flow through each of said beds in a first direction while said bed is being heated and to flow through each of said beds in the opposite direction while said bed is being cooled.

2. The heat pump system of claim 1 wherein said bed heating and cooling loop portions includes regenerator means for transferring heat between the hotter refrigerant passing out said beds and the colder refrigerant passing out of said beds so as to minimize the amount of heat that has to be added to and removed from said refrigerant in said bed heating and cooling loop portion.

3. The heat pump system of claim 1 wherein said integrated heat pump circuit and heating loop includes:

first check valve means connecting the hotter higher pressure refrigerant passing out of said beds to the high pressure side of said heat pump circuit portion of said integrated heat pump circuit and heating loop to permit refrigerant to flow into said heat pump circuit portion while preventing refrigerant flow from the high pressure side of said heat pump circuit portion into said beds; and second check valve means connecting the low pressure side of said heat pump circuit portion of said integrated heat pump circuit and heating loop to the colder lower pressure refrigerant passing into said beds to permit refrigerant to flow from said heat pump circuit portion into said beds preventing refrigerant flow from said beds into the low pressure side of said heat pump circuit portion.

4. A heat pump system for conditioning a prescribed space comprising:

at least one hermetically sealed solid adsorbent bed having a first access opening thereto and a second access opening thereto spaced from said first access opening so that fluid can pass through said bed between said access openings;

a refrigerant:

an integrated refrigerant circuit having a heat pump circuit portion and a bed heating and cooling arrangement including a bed heating portion and a bed cooling portion connected to said bed through said first and second access openings for heating and cooling said refrigerant so as to alternately heat and cool said bed while simultaneously using a portion of the refrigerant passing into and out of said bed to condition the prescribed space, said bed heating and cooling loop portion further including:

primary cooling means for cooling said refrigerant passing through said bed heating and cooling loop portion and using the heat recovered from the cooling of said refrigerant to heat the conditioned space;

auxiliary cooling means for alternatively cooling said refrigerant passing through said bed heating and cooling loop portion and discharging the heat recovered from the cooling of said refrigerant to the atmosphere; and, flow diverter means for selectively and alternatively causing said refrigerant flowing through said bed heating and cooling loop portion to flow through said primary cooling means while bypassing said auxiliary cooling means or to flow through said auxiliary cooling means while bypassing said primary cooling means.

5. A heat pump system for conditioning a prescribed space comprising:

at least one hermetically sealed solid adsorbent bed having a first access opening thereto and a second access opening thereto spaced from said first access opening so that fluid can pass through said bed between said access openings;

a refrigerant;

an integrated refrigerant circuit having a heat pump circuit portion and a bed heating and cooling arrangement including a bed heating portion and a bed cooling portion connected to said bed through said first and second access openings for heating and cooling said refrigerant so as to alternately heat and cool said bed while simultaneously using a portion of the refrigerant passing into and out of said bed to condition the prescribed space, wherein said bed heating and cooling loop portion further including:

first pumping means for generating a sufficient pressure differential across said bed being cooled to cause said refrigerant to flow through said bed; and, second pumping means for generating a sufficient pressure differential across said bed being heated to cause said refrigerant to flow through said bed.

6. The heat pump system of claim 5 wherein said first and second pumping means generate a pressure differential of about 1–2 psig across said beds.

7. The heat pump system of claim 1 wherein said heat pump circuit portion includes reversing valve means for selectively reversing the flow of refrigerant around said heat pump circuit portion to selectively heat or cool the conditioned space.

8. The heat pump system of claim 2 wherein said integrated heat pump circuit and heating loop includes:

first check valve means connecting the hotter higher pressure refrigerant passing out of said beds to the high pressure side of said heat pump circuit portion of said integrated heat pump circuit and heating loop to permit refrigerant to flow into said heat pump circuit portion while preventing refrigerant flow from the high pressure side of said heat pump circuit portion into said beds; and second check valve means connecting the low pressure side of said heat pump circuit portion of said integrated heat pump circuit and heating loop to the colder lower pressure refrigerant passing into said beds to permit refrigerant to flow from said heat pump circuit portion into said beds preventing refrigerant flow from said beds into the low pressure side of said heat pump circuit portion.

9. The heat pump system of claim 8 wherein said bed heating and cooling loop portion includes:

primary cooling means for cooling said refrigerant passing through said bed heating and cooling loop portion and using the heat recovered from the cooling of said refrigerant to heat the conditioned space;

auxiliary cooling means for alternatively cooling said refrigerant passing through said bed heating and cooling loop portion and discharging the heat recovered from the cooling of said refrigerant to the atmosphere; and, flow diverter means for selectively and alternatively causing said refrigerant flowing through said bed heating and cooling loop portion to flow through said primary cooling means while bypassing said auxiliary cooling means or to flow through said auxiliary cooling means while bypassing said primary cooling means.

10. The heat pump system of claim 9 wherein said bed heating and cooling loop portion includes:

first pumping means for generating a sufficient pressure differential across said bed being cooled to cause said refrigerant to flow through said bed; and, second pumping means for generating a sufficient pressure differential across said bed being heated to cause said refrigerant to flow through said bed.

11. The heat pump system of claim 10 wherein said first and second pumping means generate a pressure differential of about 1–2 psig across said beds.

12. The heat pump system of claim 11 wherein said heat pump circuit portion includes reversing valve means for selectively reversing the flow of refrigerant around said heat pump circuit portion to selectively heat or cool the conditioned space.

13. A method of operating a heat pump system with a solid adsorbent bed having an adsorbent capable of adsorbing a refrigerant as the adsorbent is cooled and desorbing the refrigerant as the adsorbent is heated comprising the step of:

a) passing a refrigerant through the bed so as to generate a thermal wave in the bed with the refrigerant used to heat and cool the bed whereby the refrigerant mass flow out of the bed is increased over the refrigerant mass flow into the bed when the bed is being heated, and the refrigerant mass flow out of the bed is decreased over the refrigerant mass flow into the bed when the bed is being cooled.

14. The method of claim 13 wherein step a) further comprises passing the refrigerant through a plurality of beds so that at least one of the beds is being cooled while at least another of the beds is being heated.

15. The method of claim 14 wherein step a) further comprises reversing the flow of the refrigerant through the beds at the end of each cooling and heating cycle.

16. The method of claim 15 further comprises the steps of:

b) passing a bed portion of the refrigerant through a bed heating and cooling circuit;

c) passing a space conditioning portion of the refrigerant through a heat pump circuit;

d) interconnecting the bed heating and cooling circuit to the heat pump circuit through a check valve network so that the refrigerant passing out of and into the beds can be divided between the two circuits.

17. The method of claim 16 further comprises the step of:
e) selectively reversing the flow of the refrigerant around the heat pump circuit to selectively heat and cool the space to be conditioned.

18. The method of claim 17 further comprising the step of:
f) transferring heat between the heated and cooled refrigerant passing out of the beds so as to increase the operational efficiency of the system.

* * * * *